United States Patent [19]

Bell

[11] 3,731,285

[45] May 1, 1973

[54] HOMOGENEOUS MEMORY FOR DIGITAL COMPUTER SYSTEMS

[76] Inventor: C. Gordon Bell, 553 Briarcliff, Pittsburgh, Pa. 15221

[22] Filed: Oct. 12, 1971

[21] Appl. No.: 188,084

[52] U.S. Cl. ....................340/172.5

[51] Int. Cl. ....................G11c 7/00

[58] Field of Search ....................340/172.5, 173 R, 340/173 SP

[56] References Cited

UNITED STATES PATENTS

| | | | |
|---|---|---|---|
| 3,311,887 | 3/1967 | Muroga | 340/172.5 |
| 3,444,527 | 5/1969 | Hartley et al. | 340/172.5 |
| 3,553,653 | 1/1971 | Krock | 340/172.5 |
| 3,602,899 | 8/1971 | Lindquist et al. | 340/172.5 |
| 3,657,705 | 4/1972 | Mekota, Jr. et al. | 340/172.5 |
| 3,659,275 | 4/1972 | Marshall | 340/172.5 |

*Primary Examiner*—Paul J. Henon
*Assistant Examiner*—Melvin B. Chapnick
*Attorney*—Robert A. Cesari et al.

[57] ABSTRACT

A digital computer system with a memory unit comprising both "read-only" locations from which information can only be read and "read-write" locations from which information can be read and into which information can be written. Both read-only and read-write memory locations store information in the same format, but each read-only location contains an extra bit position for a "state" bit. The digital computer system normally addresses the read-only locations in sequence. If a state bit in any read-only location is set, a control in the memory interprets the information in that location as an address, normally for a read-write memory location for storage or retrieval of information. When the state bit is not set, the read-only location contains information for direct use by the digital computer system.

7 Claims, 3 Drawing Figures

Patented May 1, 1973 3,731,285

2 Sheets-Sheet 2

HOMOGENEOUS MEMORY FOR DIGITAL COMPUTER SYSTEMS

BACKGROUND OF THE INVENTION

This invention generally relates to digital computer systems and more specifically to a memory for such systems.

There are two types of random access memory utilized in digital computer systems. They are generally referred to "read-only" memories and "read-write" memories. Read-only memories contain information (either instructions or data) which cannot be altered. That is, the digital computer system cannot alter information in a read-only memory in response to an instruction. Although this feature is sometimes a disadvantage, read-only memories do have many advantages. They are more reliable because they are permanently wired. This reliability eliminates the need to retain any program copies once a read-only memory has been properly programmed. Further, a read-only memory operates more quickly and is less expensive than a read-write memory with like storage capabilities.

Oftentimes it is desirable to construct a system with both memory types to gain the advantages of both. For example, a read-only memory can store instructions, constants and other fixed information. A read-write memory then stores variable data and other alterable information. A so-called "heterogeneous" memory, for example, uses both types, but each is physically separated and must be addressed separately. Low-order addresses identify read-only locations while high-order addresses identify read-write locations, for example.

This and other examples of combined read-only and read-write memories may use different programming languages for each type. This complicates programming both from a preparation and a correction standpoint. First, separate languages require a programmer to comprehend two complete languages. Secondly, if the languages are not compatible, a digital computer system with read-write memory can neither generate the information necessary to construct a read-only memory once a program is properly produced nor analyze any memory errors readily.

Therefore, it is an object of this invention to provide a homogeneous memory which provides the advantages of read-only and read-write memories.

Another object of this invention is to provide a homogeneous memory which does not require any digital computer system alterations.

Still another object of this invention is to provide a homogeneous read-only and read-write memory which does not alter programming procedures.

SUMMARY

In accordance with my invention, a memory with both read-only and read-write memory locations is modified by adding an extra bit position to each read-only memory location. A control circuit in the memory interprets the contents of the location and alters the memory operation. If the extra bit has a first condition (i.e., normally "set") the memory interprets the contents of the location as a read-write memory address and decodes the address to make the read-write location available. With the other bit condition (i.e., not "-set"), the control uses the read-only memory location contents as information which is to be directly processed by the digital computer system.

With this arrangement, instructions and data in a single-language program are selectively stored in either type of memory depending upon their characteristics. Read-write memory locations are allocated to individual instructions or data which the system may alter; read-only memory, to all other data and instructions. My memory unit uses both types of memory by merely adding an extra bit position to each read-only memory location. Only minimal and simple programming language changes are necessary. Further, the memory itself preferably contains all circuits necessary to interpret the extra bit information so it can be added to any digital computer system without affecting system operation. Hence, my homogeneous memory provides a digital computer system which operates in accordance with the advantages of both read-only memory and read-write memory.

My invention is pointed out with particularity in the appended claims. Further objects and advantages of this invention may be better understood by referring to the following detailed description taken in conjunction with the accompanying drawings.

BRIEF DESCRIPTION OF THE DRAWINGS

FIG. 1 schematically depicts a typical digital computer system 10. Peripheral units 12 transfer information into and receive information from the digital computer system 10. Specifically, input devices 14, such as teletypewriters, line printers, tape readers, magnetic disks or drums and the like constitute peripheral units 12. An operator's console 16 enables a programmer or machine operator to operate the digital computer system 10 directly by controlling its operation externally and transferring information to the main memory or program counter.

Figure 1:
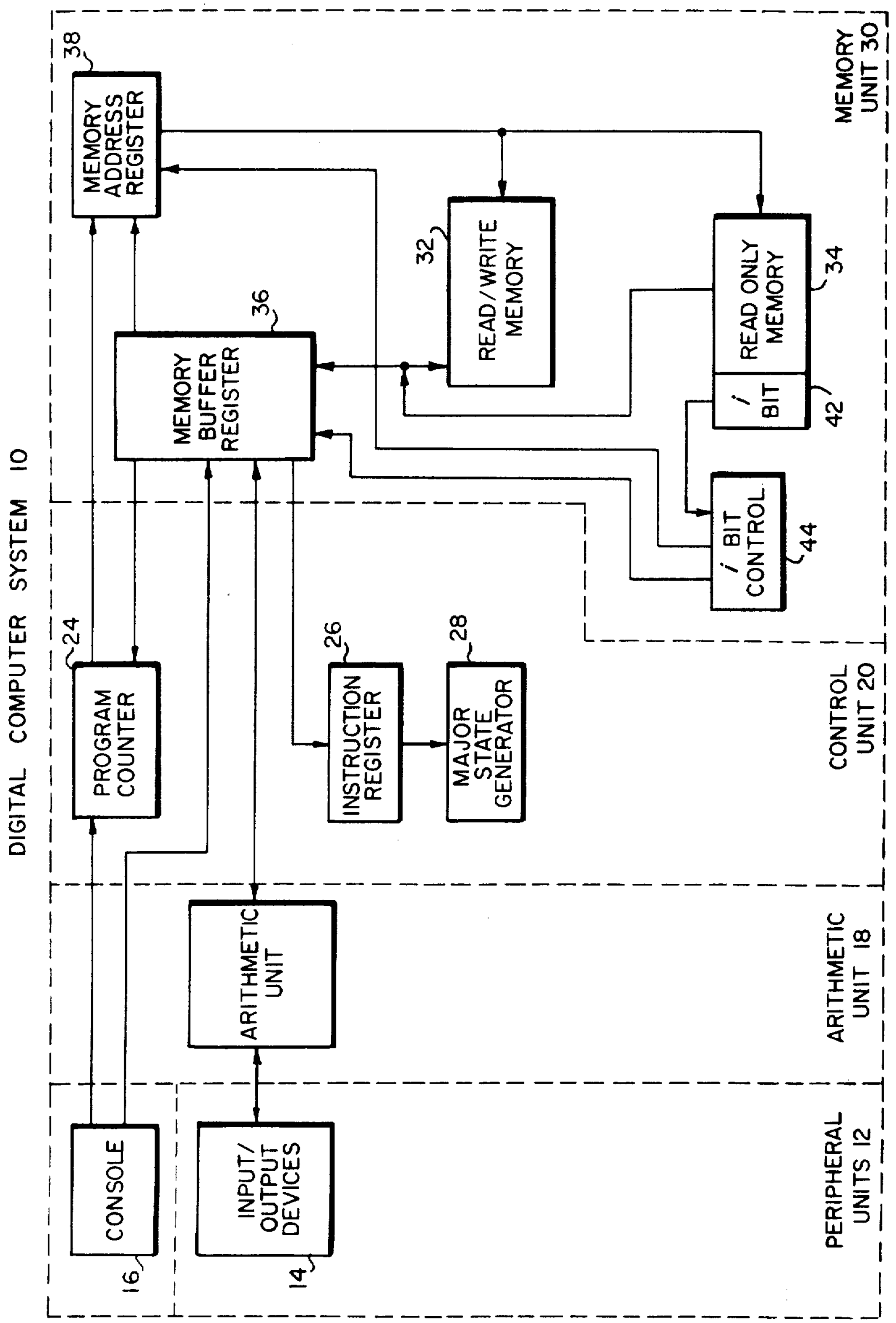
FIG. 1 is a schematic block diagram of a digital computer system adapted to use my invention.

An arithmetic unit 18 accepts data from input devices and transmits processed data to output devices. Its primary function is to perform calculations under the direction of a control unit 20. The arithmetic unit 18 usually includes at least an accumulator register and other registers and control circuitry necessary for performing various logical and arithmetic operations.

The control unit 20 contains a program counter 24, an instruction register 26 and a major state generator 28. The program counter 24 records memory addresses for instructions to be executed, usually the address of the next instruction to be executed. Instructions are stored in numerically consecutive locations. The program counter 24 may also be set to some value through the console 16 or, in response to certain instructions, by the contents of other instructions.

The instruction register 26 specifies the main characteristics of the instruction being executed. It generally receives an operation code contained in an instruction. Other logic circuits in the control unit 20 respond to signals from the instruction register 26 and then subsequently control operations in conjunction with the major state generator 28.

This generator, or its equivalent, establishes the proper operating sequence for each instruction. For purposes of this explanation, assume that the major state generator 28 generates "fetch", "defer" and "execute" signals representing corresponding system operating states. These states generally control the transfer of information within the digital computer system as described later and may comprise "reading" or "writing" cycles.

In accordance with this invention, a memory unit 30 contains a read-write memory 32, a read-only memory 34, a memory buffer register 36 and a memory address register 38. Notwithstanding any distinction between read-write memory 32 and read-only memory 34, the digital computer system 10 can (1) transfer the contents of the program counter 24 to the memory address register 38, (2) increment the program counter 24, (3) decode the memory address and (4) obtain the contents of the addressed location. As the central processor only obtains an instruction during this sequence, which occurs in the "fetch" state, it is, by definition, a reading cycle. During the fetch state the system 10 also decodes any instructions to determine the operand address and operation code. Depending upon the instruction, the system may use another reading cycle to move new information to the memory address register 38 for use in the execute or defer states. For other instructions the system may prepare a specific memory location to receive data (a "writing" cycle).

Once fetch state terminates, the system branches to the defer state if the instruction register 26 decodes an "indirect" bit in the instruction itself. If this bit is set, the system uses the memory buffer register contents as an address. Either a reading or a writing cycle than either (1) transfers data in the new address to the memory buffer register 36 or (2) couples the addressed read-write location to the memory buffer register 36 for a subsequent writing operation.

When the system 10 either completes or omits the defer state, it starts the execute state, in which the system 10 either acts on the information in the memory buffer register 36 in accordance with the previously decoded instruction or transfers information through the memory buffer register 36 to the previously defined location in the memory unit 30. In response to other instructions the system may transfer a portion of data in the memory buffer register 36 to the program counter 24, as for example when the digital computer system 10 shifts to a subroutine.

FIG. 1 depicts the read-write memory units for purposes of illustration only. As becomes clearer later, the control unit 20 actually "sees" only a single set of locations and does not distinguish between them. Internally the actual circuits may be separated into distinct blocks or they may be intermixed. As specifically shown in FIG. 2, one portion 40*a* of the memory comprises read-only memory locations while the other portion 40*b* comprises read-write memory locations. Any memory location, be it read-only memory or read-write memory, may contain an instruction or data to be processed. The only structural difference is the addition of the "*i* bit" position 42. The memory unit itself usually contains the circuitry for responding to this bit, so the control unit 20 never processes it. When an instruction identifies a specific location in memory as a data address, the memory unit transfers the contents of the specified location to the central unit 20 directly if the *i* bit is not set at the specified location. If the *i* bit were set, the memory unit would operate internally to decode the contents of the specified location as the address for a read-write memory location and either obtain the read-write memory location contents or prepare the location to receive data.

Any time the system requests a reading or writing memory cycle, an *i* bit control 44 evaluates the *i* bit position in the addressed read-only memory location. There are several ways this can be accomplished depending on the operating characteristics of the digital computer system 10. The system shown in FIG. 1 generates signals indicating the beginning of a memory cycle and the type (i.e., reading or writing). These signals disable the control unit 20 and inhibit any further system operations until the memory unit 30 completes the memory cycle and generates a return signal for the control unit 20. This return signal enables the control unit 20 to continue its operation. In fact, it is possible to consider that the control unit 20 merely pauses during each reading or writing cycle.

The *i* bit control 44 enables the memory unit 30 to generate the return signal as soon as the contents of the location addressed by the program counter 24 are in the memory buffer register 36 when the read-only location contains an instruction or constant. However, when the *i* bit is set, the *i* bit control 44 delays the return signal until the memory unit 30 transfers the addressed read-only location contents to the memory address register 38, decodes the address and either (1) transfers the addressed location contents to the memory buffer register 36 (the reading cycle) or (2) the contents of the memory buffer register 36 to the addressed location (the writing cycle).

Figures 2, 3:
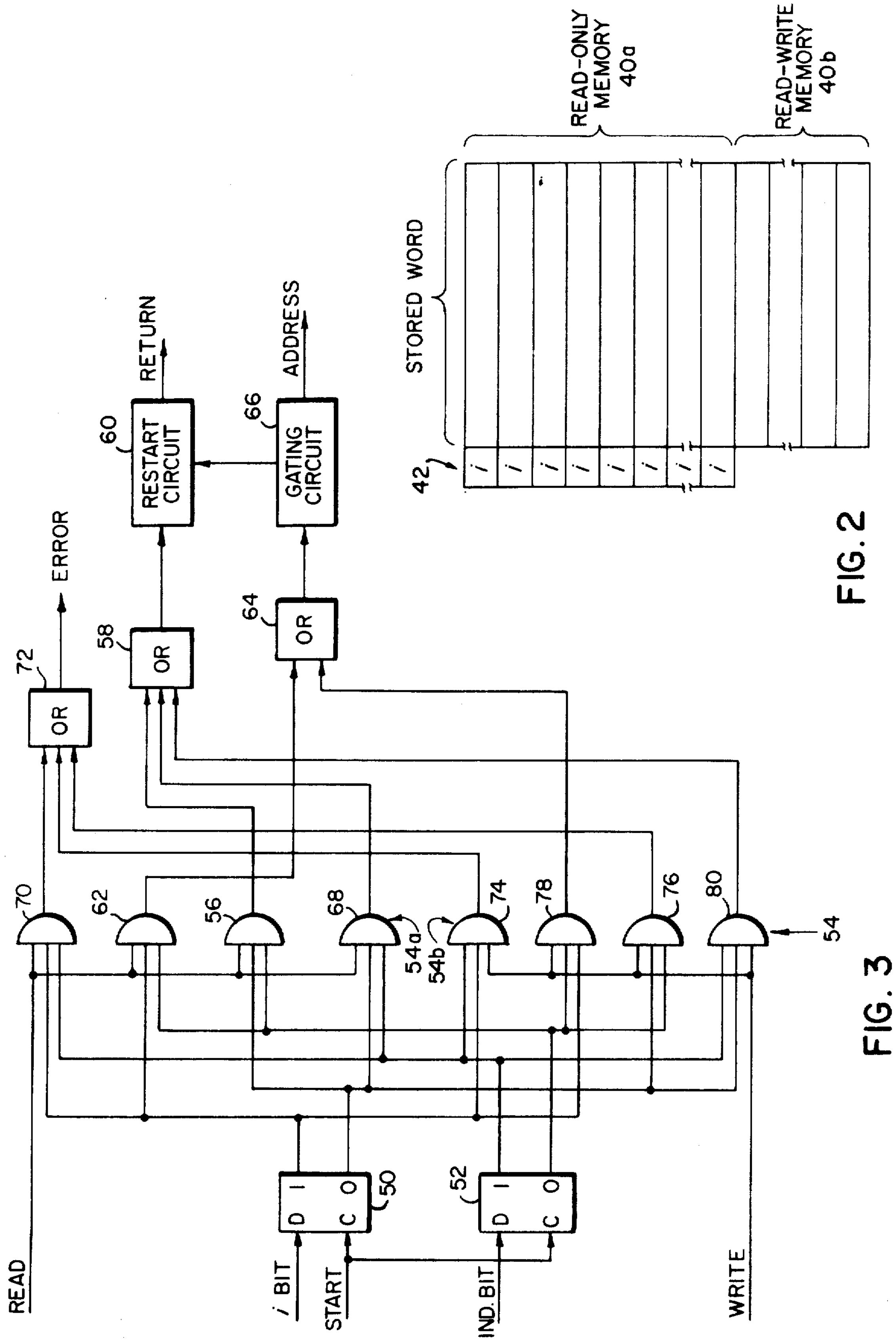
FIG. 2 is a schematic diagram of one embodiment of a memory unit shown in FIG. 1.
FIG. 3 is a detailed logic diagram of a memory control circuit used in the system shown in FIG. 1.

Now referring to FIGS. 1 and 3 wherein FIG. 3 illustrates a typical *i* bit control 44, this specific embodiment assumes that logic signals of positive assertion and that instructions may include a deferral or "indirect bit". Whenever the system starts a reading or writing cycle it generates a START signal and either a READ and WRITE signal. The START signal clocks DC flip-flop circuits 50 and 52. The data inputs to these flip-flops are the *i* bit from the addressed location and an *ind* bit, respectively. The *ind* bit comes from the indirect bit position in an instruction, so it may not always be present. If it is not present, it is considered to be reset. An eight-way decoder 54, with a read section 54*a* and a write section 54*b*, responds to the *i* and *ind* bits to control the memory unit operation.

Looking first at reading cycles (i.e., the system 10 generates READ and START signals), the digital computer system 10 accepts the contents in the memory buffer register 36 at the end of the memory cycle as data or an instruction if the *ind* bit is not asserted. If the *i* bit is not set, an AND circuit 56 energizes an OR circuit 58, so a restart circuit 60 generates the RETURN signal. This signal restarts the digital computer system 10 and the control 20 (FIG. 1). If the *i* bit sets the flip-flop 50, another AND circuit 62 energizes an OR circuit 64 so a gating circuit 66 generates an ADDRESS signal. This signal causes the memory unit 30 to (1) transfer the contents of the addressed location to the memory buffer register 36 and then to the memory address register 38, (2) decode the address and (3)

transfer the second addressed location contents to the memory buffer register 36 as data or an instruction. Once the memory 30 completes this memory cycle, the gating circuit 66 enables the restart circuit 60 to generate the RETURN signal to restart the system 10.

Now referring to a reading memory cycle when the flip-flop 52 is set, an AND circuit 68 responds to a reset flip-flop 50 to energize the OR and restart circuits 58 and 60. In this case the control 20 responds to the *ind* bit by using another reading or writing memory cycle. If the flip-flop circuit 50 is set, an AND circuit 70 energizes an OR circuit 72 and generates an ERROR signal. This condition may or may not be an actual error condition, depending upon the specific digital computer system. It may represent a double deferral addressing mode wherein the system uses the operand address to obtain an address for a data location.

Now referring to writing cycles, if both flip-flop circuits 50 and 52 are set, an AND circuit 74 energizes the OR circuit 72. As with a reading cycle, this ERROR signal may represent an actual error condition or, in some systems, a double deferral addressing condition. If a specific digital computer system can perform double deferral addressing, the circuit in FIG. 3 must be modified to separate the output of the AND circuit 76 from the outputs of AND circuits 70 and 74 during reading and writing cycles.

The OR circuit 72 also produces an actual ERROR signal when AND circuit 76 is energized. This occurs when the flip-flop circuits 50 and 52 are both reset. Under these conditions the system is going to attempt to write data into a read-only memory location.

The two remaining sets of conditions are valid conditions. When the flip-flop circuit 50 is set and the flip-flop circuit 52 is reset, an AND circuit 78 energizes the OR circuit 64 and the gating circuit 66. This produces the ADDRESS signal which locates a read-write memory location and causes the restart circuit 60 to generate the RETURN signal after the memory buffer register 36 and the memory location are coupled. In the other situation, an AND circuit 80 responds to the flip-flop 50 being reset and the flip-flop 52 being set. The restart circuit 60 generates the RETURN signal as soon as the contents of the addressed location are in the memory buffer register 36.

Therefore, my invention enables read-write and read-only memory locations effectively to be intermixed and addressed by a program counter without any program modifications. Furthermore this approach enables the best advantages of both read-only memory and read-write memory to be obtained. It will be obvious, of course, that many modifications may be made to the disclosed embodiment. For example, the *i* bit control 42 could alter the major state generator operator by starting a defer or equivalent state if the *i* bit were set. Different circuits may be used for the *i* bit control to accommodate different logic levels of signals from a different computer. Although I have only described my invention in terms of instructions with one operand address, it is equally applicable to the other systems which have multiple operand addresses in selected instructions. Therefore, it is intended to cover all these and other modifications and variations as come within the true spirit and scope of this invention.

What I claim as new and desire to secure by Letters Patent of the United States is:

1. A memory unit for use in a digital computer system, said memory unit comprising:

A. an addressed read-write memory location with a predetermined number of bit positions, B. a plurality of addressed read-only memory locations, each location having the predetermined number of positions plus a position for storing a state bit, C. a decoder for selecting one location as an addressed location in response to D. a control unit including:

1. first means responsive to a first condition of the state bit in a read-only memory location for obtaining the contents of the addressed location as data, and
2. second means responsive to the second condition of the state bit to obtain the contents of the addressed location as an address for a second location containing data, said decoder responding then to the second location address.

2. A memory as recited in claim 1 wherein said control unit includes: i) gating means responsive to an input signal from a digital computer system indicating the start of a memory operation, and ii) third means for generating an output signal when a data location has been obtained by said first or second means.

3. A memory unit as recited in claim 2 wherein each memory location additionally has a deferral bit position for altering digital computer system response to the contents of a memory location and the digital computer system additionally generates reading and writing signals to define a specific memory cycle, said gating means comprising means responsive to the conditions of the state and deferral bits for generating control signals including the output signal and a signal indicating first conditions of signals in both bit positions.

4. A digital computer system comprising:

A. a program counter,

B. a memory including:

1. a plurality of addressed read-write memory locations with a predetermined number of bit positions,
2. a plurality of read-only memory locations having the predetermined number of bit positions plus a position for storing a state bit,
3. an address decoder responsive to signals from said program counter for selecting a specified memory location, and
4. a buffer register for coupling to an addressed memory location, C. a first control unit for a normally sequencing said program counter to address successive read-only memory locations, said control unit additionally including:

1. means for generating a starting signal for inhibiting further digital computer system operation and initiating a memory cycle for coupling a memory location to said buffer register, and
2. means responsive to a memory output signal for restarting digital computer operation and D. a memory control including:

1. first means responsive to the starting signal for energizing said address decoder and transferring the contents of the addressed memory location to said buffer register, 2. second means responsive to the first condition of the state bit for generating the memory output signal when said memory buffer register contains the addressed memory location contents, and 3. third means responsive to the second condition of the state bit for using the contents of said addressed location as an address for an other memory location and coupling said other memory location and said memory buffer register before generating the memory output signal.

5. A digital computer system as recited in claim 4 wherein at least one memory location has a deferral bit position, said first control unit responding to a deferral bit by initiating another memory cycle using the contents of said memory buffer register as a memory address, said memory control additionally comprising means responsive to the existence of the deferral bit for generating the memory output signal when the state bit is in the first condition and means for generating a second signal when the state bit is in the second condition.

6. A digital computer system as recited in claim 5 wherein said first control unit generates a writing signal, said third means responding to the writing signal by connecting said other memory location and said memory buffer register for subsequent transfer of data to said other memory location.

7. A digital computer system as recited in claim 6 wherein said first control unit generates a reading signal, said third means responding to the reading signal by transferring the contents of said other memory location to said memory buffer register.

* * * * *